United States Patent [19]

Anders et al.

[11] Patent Number: 4,493,673
[45] Date of Patent: Jan. 15, 1985

[54] TORSIONAL VIBRATION DAMPER UNIT

[75] Inventors: Peter Anders, Schweinfurt; Bernhard Schierling, Unterpleichfeld, both of Fed. Rep. of Germany

[73] Assignee: Fichtel & Sachs AG, Schweinfurt, Fed. Rep. of Germany

[21] Appl. No.: 429,522

[22] Filed: Sep. 30, 1982

[30] Foreign Application Priority Data

Oct. 29, 1981 [DE] Fed. Rep. of Germany ....... 3142842

[51] Int. Cl.³ .................... F16D 3/14; F16D 13/64; F16F 15/12
[52] U.S. Cl. .................................. 464/66; 192/106.2
[58] Field of Search ............ 74/574; 192/70.17, 106.1, 192/106.2; 464/62, 66, 67, 81

[56] References Cited

U.S. PATENT DOCUMENTS

| | | | |
|---|---|---|---|
| 2,158,244 | 5/1939 | Mistretta et al. ................. | 464/66 X |
| 3,128,640 | 4/1964 | Zeidler .................................. | 74/574 |
| 3,414,101 | 12/1968 | Binder et al. ..................... | 192/106.2 |
| 3,799,309 | 3/1974 | Cook ................................. | 192/106.2 |
| 4,351,167 | 9/1982 | Hanke et al. ................. | 192/106.2 X |
| 4,352,420 | 10/1982 | Maycock .......................... | 192/106.2 |

FOREIGN PATENT DOCUMENTS 1469633 4/1977 United Kingdom ................ 464/66

Primary Examiner—Stuart S. Levy
Assistant Examiner—Daniel P. Stodola
Attorney, Agent, or Firm—Toren, McGeady and Stanger

[57] ABSTRACT

A clutch disc as used e.g. in motor vehicle clutches comprises a hub member and a friction lining carrier. The friction lining carrier surrounds the hub member and is mounted thereon for angular movement with respect to the hub member about the axis of rotation of the hub member. A torque is transmitted from the friction lining carrier to the hub member by two groups of torque transmitting springs which are arranged in series. A first group of torque transmitting springs is provided between the hub member on the one hand and an intermediate torque transmission unit on the other hand. A second group of torque transmitting springs is provided between the intermediate torque transmission unit on the one hand and the friction lining carrier on the other hand. Each torque transmitting spring is received by radially aligned openings of three respective torque transmitting sleeves.

21 Claims, 2 Drawing Figures

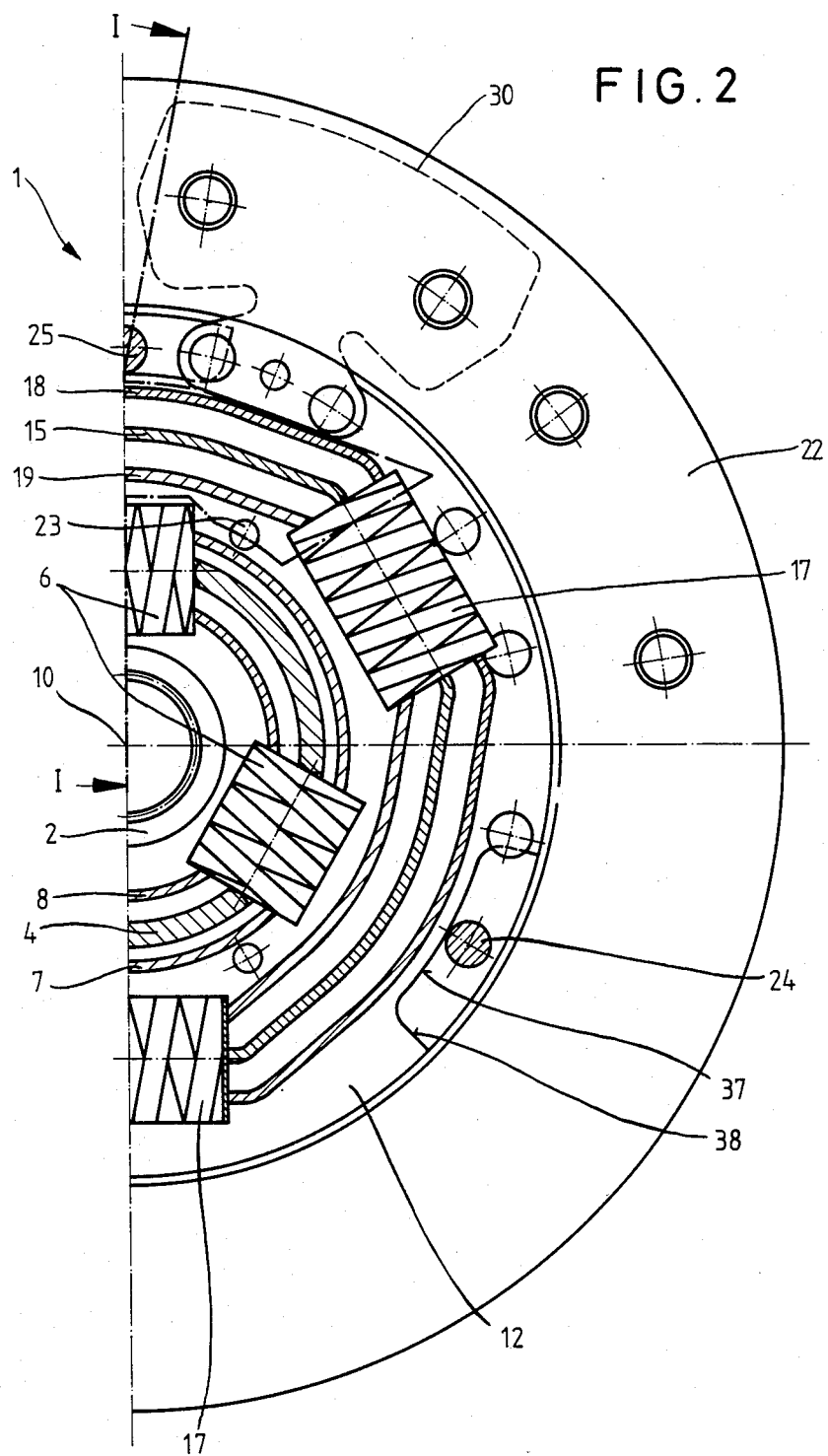

4,493,673

TORSIONAL VIBRATION DAMPER UNIT

SUMMARY OF THE INVENTION

The present invention is directed to a torsional vibration damper unit which is particularly but not exclusively intended for use in clutch discs of motor vehicles and the like. The torsional vibration damper unit of this invention comprises a torque output member having an axis of rotation. A torque input member is mounted for angular movement with respect to said torque output member about said axis of rotation. A torque output transmission unit is fixed to said torque output member for common rotation therewith about said axis of rotation. A torque input transmission unit is fixed to said torque input member for common rotation therewith about said axis of rotation. An intermediate torque transmission unit is mounted for angular movement about said axis of rotation with respect to said torque output transmission unit and said torque input transmission unit. At least one first torque transmitting spring unit is provided in torque transmitting arrangement between said torque output transmission unit and said intermediate torque transmission unit. The first torque transmitting spring unit has a working line substantially tangential with respect to the axis of rotation. At least one second torque transmitting spring unit is provided in torque transmitting arrangement between the intermediate torque transmission unit and the torque input transmission unit. This second torque transmitting spring unit is also positioned such that its working line is substantially tangential with respect to the axis of rotation.

Such a torsional vibration damper unit is known e.g. from U.S. Pat. No. 3,128,640. In this known construction the torque output transmission unit comprises a radially outwardly directed flange of the hub member and the torque input transmission unit comprises an annular disc surrounding the flange radially outwardly thereof. The intermediate torque transmission unit comprises two annular side discs axially adjacent to opposed sides of both said flange and said annular disc. The side discs are interconnected by interconnecting members. A first group of helical compression springs are received by axially aligned openings of the flange and the side discs. A second group of helical compression springs are received by axially aligned openings of the annular disc and the side discs. The annular disc is limited in its angular movement with respect to the flange by interengaging teeth provided at the radially outer edge of the flange and at the radially inner edge of the annular disc respectively. The known construction has a relatively large radial extent.

It is a primary object of the present invention to provide a torsional vibration damper unit of the above-defined type which can be manufactured with reduced radial extent.

A further object of this invention is to provide a torsional vibration damper unit of the above-defined type which allows a large way of angular movement of the torque input member with respect to the torque output member.

In accordance with the present invention, the first torque transmitting spring unit and the second torque transmitting spring unit are received in three respective radially aligned openings of a plurality of torque transmitting sleeve units, at least one of said torque transmitting sleeve units being a part of said torque output transmission unit, at least one of said torque transmitting sleeve units being a part of said torque input transmission unit, and at least of said torque transmitting sleeve units being a part of said intermediate torque transmission unit.

According to a preferred embodiment of the invention the first torque transmitting spring unit is received by radially aligned openings of three first torque transmitting sleeve units surrounding said axis of rotation, namely a first middle sleeve unit and two first side sleeve units, said first side sleeve units being arranged radially inwardly and radially outwardly of said first middle sleeve unit, respectively, said first middle sleeve unit being a part of one of said torque output transmission unit and said intermediate torque transmission unit, said two first side sleeve units being parts of the other of said torque output transmission unit and said intermediate torque transmission unit. The second torque transmission spring unit is received by radially aligned openings of three second torque transmitting sleeve units surrounding said axis of rotation, namely a second middle sleeve unit and two second side seeve units, said second side sleeve units being arranged radially inwardly and radially outwardly of said second middle sleeve unit, respectively, said second middle sleeve unit being a part of one of said torque input transmission unit and said intermediate torque transmission unit, said two second side sleeve units being parts of the other of said torque input transmission unit and said intermediate torque transmission unit.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawing:

FIG. 2 is an end view partially in section according to line II—II of FIG. 1.

DETAIL DESCRIPTION OF THE INVENTION

Figure 1:
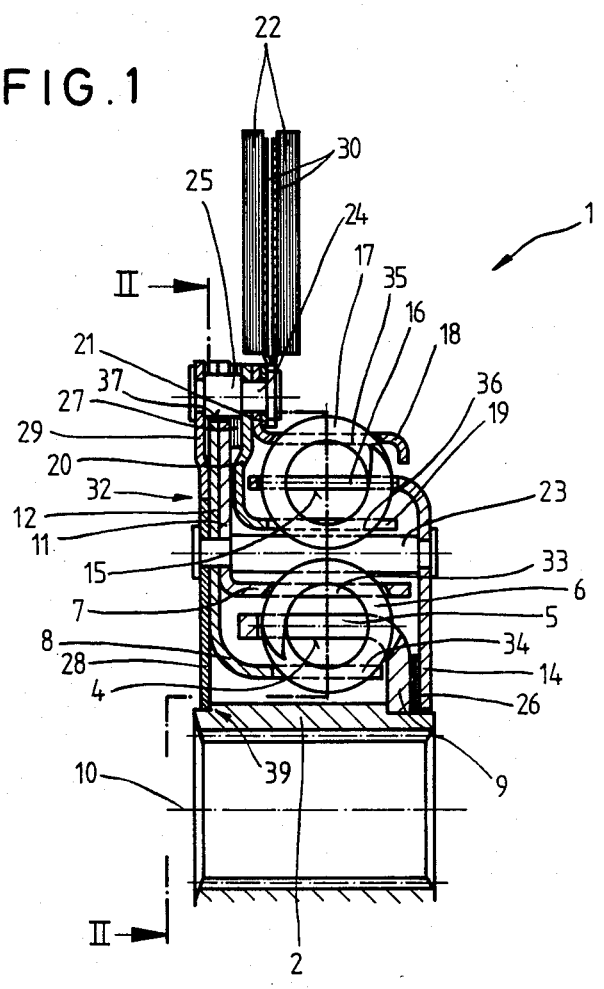
FIG. 1 is a partial, sectional view of a clutch disc comprising a torsional vibration damper unit according to this invention, the plane of section containing the axis of rotation of the clutch disc and following the line I—I of FIG. 2.

In FIGS. 1 and 2, a hub member of a clutch disc 1 is designated by 2. This hub member 2 is provided with radially inner splines such that the hub member can be mounted on a shaft (not illustrated), e.g. an input shaft of a gear box, and a torque can be transmitted from the hub member 2 to the shaft. The hub member 2 can be regarded as a torque output member.

The hub member 2 is surrounded by a friction lining carrier 30 which is provided with friction linings 22. The friction linings are intended for engagement between a driving disc of a motor output shaft and a pressure disc of a usual motor vehicle clutch. The friction lining carrier 30 with the friction linings 22 can be regarded as a torque input member. The torque is transmitted from the torque input member 30, 22 to the torque output member or hub member 2 by the torsional vibration damper unit of this invention.

A first middle sleeve 4 is fixed to the hub member 2 by a radially inwardly directed flange 9 integral with the first middle sleeve 4. The middle sleeve 4 with its flange 9 may be regarded as a torque output transmission unit.

A second middle sleeve 15 is mounted on the hub member 2 by a radially inwardly directed flange 14. This flange 14 is angularly movable with respect to the hub member 2. First side sleeves 7 and 8 are provided radially outwardly and radially inwardly of the first middle sleeve 4, respectively. The first side sleeves 7 and 8 are provided with radially outwardly directed flanges 11 and 12, respectively, which are adjacent each other. The radially outwardly directed flanges 11 and 12 are fastened for common rotation to the radially inwardly directed flange 14 of the second middle sleeve 15 by interconnecting bolts 23. The unit comprising the first side sleeves 7 and 8 with their radially outwardly directed flanges 11 and 12 and the second middle sleeve 15 with its radially inwardly directed flange 14 may be regarded as an intermediate torque transmission unit.

Two second torque transmission sleeves 18 and 19 are provided radially outwardly and radially inwardly of the second middle sleeve 15 respectively. These second torque transmitting sleeves 18 and 19 are provided with radially outwardly directed flanges 21 and 20, respectively. The radially outwardly directed flanges 20 and 21 are fixed to the friction lining carrier 30 by rivets 24. The torque transmitting sleeves 18 and 19 with their radially outwardly directed flanges 21 and 20 may be regarded as a torque input transmission unit.

As mentioned before, the torque output transmission unit 4, 9 is fixed to the hub member 2 both in axial and circumferential direction. The intermediate torque transmission unit 7, 11; 8, 12; 15, 14 is mounted for angular movement with respect to the hub member 2 by the radially inward edge of the radially inwardly directed flange 14 and by the radially inward edge of a bearing disc 28 which is connected to the radially outwardly directed flanges 11 and 12 of the first side sleeves 7 and 8 by the interconnecting bolts 23. The radially inward edge of the bearing disc 28 engages a recess 39 in the hub member 2 and is thereby axially fixed with respect to the hub member 2 in one axial direction. The bearing disc 28 is angularly movable with respect to the hub member 2.

The torque input transmission unit 18, 21; 19, 20 is mounted on the intermediate torque transmission unit 7, 11; 8, 12; 15, 14 for angular movement with respect thereto. In view of this, a support disc 29 is fixed to the radially outwardly directed flanges 20 and 21 by the rivets 24. This support disc 29 has a circular radially inward edge which engages the circular radially outward edge of the bearing disc 28 at 32. The support disc 29 is thereby mounted in radial direction on the bearing disc 28. The input torque transmission unit 18, 21; 19, 20 is fixed in axial direction with respect to the intermediate torque transmission unit 7, 11; 8, 12; 15, 14 in that the radially outwardly directed flanges 11, 12 engage between the radially outwardly directed flanges 20, 21 on the one hand and the support disc 29 on the other hand.

The torque is transmitted from the intermediate torque transmission unit 7, 11; 8, 12; 15, 14 to the torque output transmission unit 4, 9 by a first group of helical compression springs 6 which are located with their axes or working lines substantially tangential with respect to the axis of rotation 10 of the hub member 2. Each of these helical compression springs 6 is received by an opening 5 of the first middle sleeve 4 and by openings 33, 34 of the side sleeves 7, 8. The helical compression springs 6 are secured in radial direction by the openings 33 and 34 being smaller in axial direction than the maximum outer diameter of the springs 6. The circumferentially directed end portions of the helical springs 6 engage the circumferentially opposed edges of the openings 5, 33 and 34.

The torque transmission from the torque input transmission unit 18, 21; 19, 20 to the intermediate torque transmission unit 7, 11; 8, 12; 15, 14 is effected by a second group of helical compression springs 17 which are received by respective openings 16, 35, 36 of the second middle sleeve 15 and the second side sleeves 18 and 19.

The angular movement of the torque input transmission unit 18, 21; 19, 20 with respect to the intermediate torque transmission unit 7, 11; 8, 12 is limited by sections 25 of increased diameter of the rivets 24 which engage in circumferentially elongated slots 37 of the radially outwardly directed flanges 11, 12. The terminal edges 38 of the slots 37 define abutments for the sections 25 of the rivets 24.

The angular movement of the intermediate torque transmission unit 7, 11; 8, 12; 15, 14 with respect to the torque output transmission unit 4, 9 is frictionally damped by a friction lining 26 provided between the radially inwardly directed flanges 9 and 14. The friction lining 26 is under axial pressure between the radially inwardly directed flanges 9 and 14 due to the interconnecting members 23.

The angular movement of the torque input transmission unit 18, 21; 19, 20 with respect to the intermediate torque transmission unit 7, 11; 8, 12; 15, 14 is frictionally damped by a friction lining 27 located between the radially outwardly directed flanges 20, 21 on the one hand and the radially outwardly directed flanges 11 and 12 on the other hand. This friction lining 27 is subject to an axial pressure between the radially outwardly directed flanges 20, 21 on the one hand and the radially outwardly directed flanges 11, 12 on the other hand due to the rivet 24.

As can be seen from FIG. 2, a plurality of first helical compression springs 6 and second helical compression springs 17 are provided. Each first helical compression spring 6 is located between two respective second helical compression springs 17 so that the first and second helical compression springs 17 can overlap in radial direction.

The interconnecting members 23 are provided, as can be seen from FIG. 2, along a circle, the radius of which corresponds substantially to the radial distance of the radially inner part of the helical compression springs 17 from the axis and to the radial distance of the radially outer part of the helical compression spring 6 from the axis 10.

As can be seen from FIG. 1, the opening 34 of the first side sleeve 8 is open in axial direction. Moreover, the opening 36 of the second side sleeve 19 is open in axial direction. This is in view of inserting the helical compression springs 6 and 17 when assembling the torsional damping unit.

The reduced radial extent of the clutch disc is achieved also due to the fact that the helical compression springs can be located in small radial distance from each other or can even overlap in radial direction when the springs of the one group are located circumferentially between respective springs of the other group.

The advantage of the reduced radial extent becomes even greater if considerable angular movement between the torque input member and the torque output member is required and if high torques are to be transmitted such that springs of large volume must be used.

The location of the interconnecting members 23 circumferentially between a respective first spring 6 and a respective second spring 17 allows further reduction of the radial extent of the clutch disc.

While according to to FIG. 2 the first springs 6 and the second springs 17 alternate in circumferential direction, it is to be understood that the springs 17 and the springs 6 can also overlap each other in circumferential direction. This allows to provide a greater number of springs and/or large springs.

Due to the engagement of the rivets 24 with the edges 38 of the slots 37 the spring characteristics can be influenced. When exceeding a predetermined angular deflection of the torque input member 30, 22 with respect to the torque output member 2 only the first springs 6 and the frictional lining 26 remain active.

As can be seen from FIG. 2, the lining carriers 30 are shaped as segments which carry the frictional linings 22.

The first springs 6 on the one hand and the second springs 17 on the other hand may be selected such that the first group of springs 6 and the second group of springs 17 provide substantially the same value of torsional resistance. In this case the total angular movement of the torque input member 30 with respect to the torque output member 2 is distributed in such a way that the angular movement of the torque input member 30 with respect to the intermediate torque transmission unit 7, 11; 8, 12; 15, 14 is substantially equal to the angular movement of the intermediate torque transmission unit 7, 11; 8, 12; 15, 14 with respect to the torque output member 2. In this case the rivets 24 abut against the terminal edges 38 of the slots 37 only in the terminal phase of the angular movement. If however the torsional resistance of the group of first springs 6 is considerably greater than the torsional resistance resulting from the group of second springs 17, e.g. due to greater stiffness of the springs 6 or to prestressing of the springs 6, angular movement occurs initially between the torque input member 30 and the intermediate torque transmission unit 7, 11; 8, 12; 15, 14 until the rivets 24 engage the edges 38 and thereafter the intermediate torque transmission unit 7, 11; 8,12; 15, 14 is rotated with respect to the torque output member 2.

This results in a bend of the line characterizing the behaviour of the torsional damping unit in a plot showing the torsional resistance of the damping unit in dependence of the angular movement of the torque input member with respect to the torque output member.

As can be seen from FIG. 1, the helical compression springs 6 can be inserted into the openings 33 and 5 in radially outward direction. Thereupon the side sleeve 8 is mounted in axial direction. The same is true for the insertion of the helical compression springs 17.

While a specific embodiment of the invention has been shown and described in detail to illustrate the application of the inventive principles, it will be understood that the invention may be embodied otherwise without departing from such principles.

The reference numerals in the claims are only for a better understanding and are by no means restrictive.

What is claimed is:

1. In a torsional vibration damper unit, such as for clutch discs comprising (a) a torque output member (2) having an axis of rotation (10);
(b) a torque input member (30) mounted for angular movement with respect to said torque output member (2) about said axis of rotation (10);
(c) a torque output transmission unit (4, 9) fixed to said torque output member (2) for common rotation therewith about said axis of rotation (10);
(d) a torque input transmission unit (18, 21; 19, 20) fixed to said torque input member (30) for common rotation therewith about said axis of rotation (10);
(e) an intermediate torque transmission unit (17, 11; 8, 12; 15, 14) mounted for angular movement about said axis of rotation (10) with respect to said torque output transmission unit (4, 9) and said torque input transmission unit (18, 21; 19, 20);
(f) at least one first torque transmitting spring unit (6) in torque transmitting arrangement between said torque output transmission unit (4, 9) and said intermediate torque transmission unit (7, 11; 8, 12; 15, 14), said first torque transmitting spring unit (6) having a working line substantially tangential with respect to said axis of rotation (10);
(g) at least one second torque transmitting spring unit (17) in torque transmitting arrangement between said intermediate torque transmission unit (7, 11; 8, 12; 15, 14) and said torque input transmission unit (18, 21; 19, 20), said second torque transmitting spring unit (17) having a working line substantially tangential with respect to said axis of rotation (10)

the improvement comprising:

said first torque transmitting spring unit (6) and said second torque transmitting spring unit (17) are received in three respective radially aligned openings (5, 33, 34; 16, 35, 36) of a plurality of torque transmitting sleeve units (4, 7, 8; 15, 18, 19), at least one (4) of said torque transmitting sleeve units being a part of said torque output transmission unit (4, 9), at least one (18, 19) of said torque transmitting sleeve units being a part of said torque input transmission unit (18, 21; 19, 20) and at least one (15, 7, 8) of said torque transmitting sleeve units being a part of said intermediate torque transmission unit (7, 11; 8, 12; 15, 14), said first torque transmitting spring unit (6) is received by radially aligned openings (5, 33, 34) of three first torque transmitting sleeve units (4, 7, 8) surrounding said axis of rotation (10), namely a first middle sleeve unit (4) and two first side sleeve units (7, 8), said first side sleeve units (7, 8) being arranged radially outwardly and radially inwardly of said first middle sleeve unit (4), respectively, said first middle sleeve unit (4) being a part of one of said torque output transmission unit (4, 9) and said intermediate torque transmission unit (7, 11; 8, 12; 15, 14), said two first side sleeve units (7, 8) being parts of the other of said torque output transmission unit (4, 9) and said intermediate torque transmission unit (7, 11; 8, 12; 15, 14); said second torque transmitting spring unit (17) is received by radially aligned openings (16, 35, 26) of three second torque transmitting sleeve units (15, 18, 19) surrounding said axis of rotation (10), namely a second middle sleeve unit (15) and two second side sleeve units (18, 19), said second side sleeve units (18, 19) being arranged radially outwardly and radially inwardly of said second middle sleeve unit (15), respectively, said second middle sleeve unit (15) being a part of one of said torque input transmission unit (18, 21; 19, 20) and said intermediate torque transmission unit (7, 11; 8, 12; 15, 14), said two second side sleeve units (18, 19) being parts of the other of said torque input transmission unit (18, 21; 19, 20) and said intermediate torque transmission unit (7, 11; 8, 12; 15, 14);

said torque output member (2) is a central hub member (2) and said torque input member (30) is surrounding said central hub member (2) radially outwardly thereof, said three first torque transmitting sleeve units (4, 7, 8) and said three second torque transmitting sleeve units (15, 18, 19) are located radially between said central hub member (2) and said torque input member (30), said three second torque transmitting sleeve units (15, 18, 19) being located radially outwardly of said three first torque transmitting sleeve units (4, 7, 8), said first middle sleeve unit (4) comprises a radially inwardly directed flange (9) fixed to said hub member (2) for common rotation therewith adjacent a first axial end thereof;

said second middle sleeve unit (15) comprises a radially inwardly directed flange (14) adjacent said first axial end of said hub member (2);

said first side sleeve units (7, 8) comprise respective radially outwardly directed flanges (11, 12) adjacent the second axial end of said hub member (2);

the radially outwardly directed flanges (11, 12) of said first side sleeve units (7, 8) are interconnected with said radially inwardly directed flange (14) of said second middle sleeve unit (15) by substantially axially extending interconnecting members (23);

said second side sleeve units (18, 19) comprise respective radially outwardly directed flanges (21, 20) fixed to said torque input member (30) which are axially adjacent said second end of said hub member (2);

said first middle sleeve unit (4) with its radially inwardly directed flange (9) defining said torque output transmission unit (4, 9);

said first side sleeve units (7, 8) with their radially outwardly directed flanges (11, 12) and said second middle sleeve unit (15) with its radially inwardly directed flange (14) defining said intermediate torque transmission unit (7, 11; 8, 12; 15, 14);

said second side sleeve units (18, 19) with their radially outwardly directed flanges (21, 20) defining said torque input transmission unit (18, 21; 19, 20).

2. A torsional vibration damper unit as set forth in claim 1, wherein said three first (4, 7, 8) and said three second (15, 18, 19) torque transmitting sleeve units are substantially co-extensive with each other in axial direction.

3. A torsional vibration damper unit as set forth in claim 1, wherein first frictional damping means (26) are provided between said torque output transmission unit (4, 9) and said intermediate torque transmission unit (7, 11; 8, 12; 15, 14).

4. A torsional vibration damper unit as set forth in claim 1, wherein second frictional damping means (27) are provided between said torque input transmission unit (18, 21; 19, 20) and said intermediate torque transmission unit (7, 11; 8, 12; 15, 14).

5. A torsional vibration damper unit as set forth in claim 1, wherein said interconnecting members (23) are located along a circle about said axis (10) having a radius substantially corresponding to the middle value of the radial distances of the working lines of said first torque transmitting spring unit (6) and said second torque transmitting spring unit (17) from said axis of rotation (10).

6. A torsional vibration damper unit as set forth in claim 1, wherein at least one of said first (6) and second spring units (17) comprises a helical compression spring engaging by its end portions circumferentially opposed edges of respective openings (5, 33, 34; 16, 35, 36).

7. A torsional vibration damper unit as set forth in claim 1, wherein said input torque transmission unit (18, 21; 19, 20) is mounted on said intermediate torque transmission unit (7, 11; 8, 12; 15, 14) for angular movement with respect thereto about said axis of rotation (10).

8. A torsional vibration damper unit as set forth in claim 1, wherein second frictional damping means (27) are provided between said radially outwardly directed flanges (11, 12) of said first side sleeve units (7, 8) on the one hand and said radially outwardly directed flanges (21, 20) of said second side sleeve units (18, 19) on the other hand.

9. A torsional vibration damper unit as set forth in claim 1, wherein the opening (34) of at least one of said three first torque transmitting sleeve units (4, 7, 8) is open in axial direction.

10. A torsional vibration damper unit as set forth in claim 1, wherein the opening (36) of at least one of said three second torque transmitting sleeve units (15, 18, 19) is open in axial direction.

11. A torsional vibration damper unit as set forth in claim 1, wherein a plurality of first torque transmitting spring units (6) and second torque transmitting spring units (17) are provided, said first torque transmitting spring units (6) being located in circumferential direction between subsequent second torque transmitting spring units (17), respectively.

12. A torsional vibration damper unit as set forth in claim 11, wherein said interconnecting members (23) are located along a circle substantially defined by radially outward faces of said first torque transmitting spring units (6) and radially inward faces of said second torque transmitting spring units (17).

13. A torsional vibration damper unit as set forth in claim 11, wherein said interconnecting members (23) are located in circumferential direction between circumferentially opposed end portions of a respective first torque transmitting spring unit (6) and a respective second torque transmitting spring unit (17).

14. A torsional vibration damper unit as set forth in claim 1, wherein said intermediate torque transmission unit (7, 11; 8, 12; 15, 14) is mounted on said hub member (2) for angular movement with respect thereto by at least one of said radially inwardly directed flange (14) of said second middle sleeve unit (15) and a bearing disc (28) fixed to said radially outwardly directed flanges (11, 12) of said first side sleeve units (7, 8).

15. A torsional vibration damper unit as set forth in claim 14, wherein said bearing disc (28) is fastened to said radially outwardly directed flanges (11, 12) of said first side sleeve units (7, 8) by said interconnecting members (23).

16. A torsional vibration damper unit as set forth in claim 14, wherein said bearing disc (28) is provided on that side of said radially outwardly directed flanges (11, 12) of said first side sleeve units (7, 8) which is remote from said first end of said hub member (2).

17. A torsional vibration damper unit as set forth in claim 16, wherein said input torque transmission unit (18, 21; 19, 20) is provided with an annular support disc (29) fixed to said radially outwardly directed flanges (21, 20) of said second side sleeve units (18, 19), said support disc (29) being located adjacent that side of said radially outwardly directed flanges (11, 12) of said first side sleeve units (7, 8) which is remote from said first end of said hub member (2), said support disc (29) having a circular radially inner edge and said bearing disc having a circular radially outer edge, said circular edges engaging each other (at 32) for angular movement with respect to each other about said axis of rotation (10), said torque input transmission unit (18, 21; 19, 20) being axially fixed with respect to said intermediate torque transmission unit (7, 11; 8, 12; 15, 14) by said radially outwardly directed flanges (11, 12) of said first side sleeve units (7, 8) being located between said radially outwardly directed flanges (21, 20) of said second side sleeve units (18, 19) on the one hand and said support disc (29) on the other hand.

18. A torsional vibration damper unit as set forth in claim 17, wherein said support disc (29) is fastened to said radially outwardly directed flanges (21, 20) of said second side sleeve units (18, 19) by fastening members (24), said fastening members 24 passing through circumferentially elongated slots (37) of said radially outwardly directed flanges (11, 12) of said first side sleeve units (7, 8).

19. A torsional vibration damper unit as set forth in claim 18, wherein second frictional damping means (29) are provided between said radially outwardly directed flanges (11, 12) of said first side sleeve units (7, 8) on the one hand and the radially outwardly directed flanges (21, 20) of said second side sleeve units (18, 19) on the other hand, said second frictional damping means (29) being subject to axial pressure exerted by said fastening members (24).

20. A torsional vibration damper unit as set forth in claim 1, wherein first frictional damping means (26) are provided between said radially inwardly directed flange (9) of said first middle sleeve unit (4) and said radially inwardly directed flange (14) of said second middle sleeve unit (15).

21. A torsional vibration damper unit as set forth in claim 20, wherein said first middle sleeve unit (4) and said first side sleeve units (7, 8) are axially fixed with respect to said hub member (2) and said radially inwardly directed flange (14) of said second middle sleeve unit (15) is axially urged towards said radially inwardly directed flange (9) of said first middle sleeve unit (4) by said interconnecting members (23).

* * * * *